US012763422B2

(12) United States Patent
Han et al.

(10) Patent No.: US 12,763,422 B2
(45) Date of Patent: Oct. 13, 2026

(54) BATTERY PACK

(71) Applicant: SK ON CO., LTD., Seoul (KR)

(72) Inventors: Jin Su Han, Daejeon (KR); Min Song Kang, Daejeon (KR); Ju Yong Park, Daejeon (KR); Sei Hoon Cho, Daejeon (KR); Ji Woong Kim, Daejeon (KR); Byeong Jun Pak, Daejeon (KR)

(73) Assignee: SK ON CO., LTD., Seoul (KR)

( * ) Notice: Subject to any disclaimer, the term of this patent is extended or adjusted under 35 U.S.C. 154(b) by 823 days.

(21) Appl. No.: 17/958,045

(22) Filed: Sep. 30, 2022

(65) Prior Publication Data

US 2023/0098593 A1 Mar. 30, 2023

(30) Foreign Application Priority Data

Sep. 30, 2021 (KR) ........................ 10-2021-0129964

(51) Int. Cl.
*H01M 50/291* (2021.01)
*H01M 50/293* (2021.01)

(52) U.S. Cl.
CPC ....... *H01M 50/291* (2021.01); *H01M 50/293* (2021.01)

(58) Field of Classification Search
CPC ............. H01M 50/291; H01M 50/293; H01M 50/204; H01M 50/22; H01M 50/218
See application file for complete search history.

(56) References Cited

U.S. PATENT DOCUMENTS

| | | | | |
|---|---|---|---|---|
| 2011/0174556 | A1 | 7/2011 | Hermann et al. | |
| 2011/0195291 | A1* | 8/2011 | Yokoyama | H01M 50/213 429/99 |
| 2016/0254504 | A1 | 9/2016 | Kim et al. | |
| 2017/0294634 | A1* | 10/2017 | Choi | H01M 50/55 |
| 2019/0207188 | A1* | 7/2019 | Miller | C09D 7/70 |
| 2020/0212385 | A1* | 7/2020 | Shi | H01M 50/258 |
| 2020/0287180 | A1* | 9/2020 | Chen | H01M 50/30 |
| 2021/0119298 | A1* | 4/2021 | Chen | H01M 50/30 |
| 2021/0288372 | A1 | 9/2021 | Kim et al. | |

FOREIGN PATENT DOCUMENTS

| | | | | |
|---|---|---|---|---|
| EP | 3675215 | B1 * | 11/2022 | B60L 50/66 |
| KR | 10-2015-0050449 | A | 5/2015 | |
| KR | 10-2021-0060414 | A | 5/2021 | |
| KR | 10-2021-0114752 | A | 9/2021 | |

OTHER PUBLICATIONS

Extended European Search Report for European Patent Application No. 22197808.3, mailed Mar. 17, 2023 (7 pages).
Office Action for Korean Patent Application No. 10-2021-0129964, mailed Dec. 8, 2025, 16 pages.

* cited by examiner

*Primary Examiner* — Tiffany Legette
*Assistant Examiner* — Albert Michael Hilton
(74) *Attorney, Agent, or Firm* — IP&T GROUP LLP

(57) ABSTRACT

A battery pack includes a pack case and a plurality of cell stacks accommodated in an accommodation space of the pack case, wherein the pack case includes a lower plate on which the plurality of cell stacks is disposed and a partition member partitioning the accommodation space, and at least a portion of the partition member may be formed of a material different from a material of the lower plate.

2 Claims, 10 Drawing Sheets

BATTERY PACK

CROSS-REFERENCE TO RELATED APPLICATION(S)

This patent document claims the priority and benefits of Korean Patent Application No. 10-2021-0129964 filed in the Korean Intellectual Property Office on Sep. 30, 2021, the disclosure of which is incorporated herein by reference in its entirety.

TECHNICAL FIELD

The present disclosure relates to a battery pack having improved safety.

BACKGROUND

Unlike primary batteries, secondary batteries may be charged and discharged, and thus may be applied to devices within various fields such as digital cameras, mobile phones, notebook computers, hybrid vehicles, and electrical vehicles. Among secondary batteries, lithium secondary batteries having high energy density and a high discharge voltage have been actively manufactured. The lithium secondary batteries are manufactured as pouch-type battery cells having flexibility, prismatic battery cells having rigidity, or cylindrical can-type battery cells.

A plurality of battery cells are stacked on each other and are mounted in a pack case in units of cell stacks that are electrically connected to form a battery pack. Such a battery pack is installed and used in an electrical vehicle or the like.

However, in such a battery pack, if one cell stack ignites, heat or flames may be easily, transferred to another cell stack adjacent thereto, and thus secondary ignition or an explosion may occur. Therefore, there is demand for a battery pack capable of preventing secondary ignition or explosions.

SUMMARY

The disclosed technology can be implemented in some embodiments to provide a battery pack that can suppress an occurrence of secondary ignition or explosion resulting from a flames or high-temperature gas occurring therein.

According to an aspect of the present disclosure, a battery pack may include: a pack case; and a plurality of cell stacks accommodated in an accommodation space of the pack case, wherein the pack case includes a lower plate on which the plurality of cell stacks are seated and a. partition member partitioning the accommodation space, and at least a portion of the partition member may be formed of a material different from a material of the lower plate.

The partition member may include a support frame coupled to the lower plate and a blocking frame coupled to the support frame and disposed to face the cell stack.

The support frame may be formed of the same material as the material of the lower plate, and the blocking frame may be formed of a material having a melting point higher than that of the material of the lower plate.

The blocking frame may be formed of a material melted at a temperature of 700° C. or higher.

The blocking frame may include a metal or an inorganic binder.

The support frame may be formed of a material including aluminum, and the blocking frame may be formed of a material including at least one of steel and mica.

The blocking frame may include a lower frame coupled to the support frame; an upper frame spaced apart from the lower frame by a predetermined distance and disposed to be parallel to the lower frame; and an intermediate frame connecting the upper frame to the lower frame.

The cell stack may include a terminal to which a busbar is fastened, and the terminal may be disposed to face the intermediate frame.

The intermediate frame may have one side connected to a center of the upper frame and the other side connected to a center of the lower frame.

The intermediate frame may have one side connected to one side of the upper frame and the other side connected to one side or the other side of the lower frame.

The intermediate frame may include a first intermediate frame connecting one side of the upper frame to one side of the lower frame and a second intermediate frame connecting the other side of the upper frame to the other side of the lower frame.

The support frame may include a bonding portion bonded to the lower plate; an expansion portion spaced apart front the bonding portion by a predetermined distance; and a coupling portion connecting the bonding portion to the expansion portion, and the blocking frame may be provided in a plate form and may be stacked on both surfaces of the coupling portion.

At least a portion of the blocking frame may be embedded in the support frame.

The battery pack may include two venting flow paths spatially separated by the single partition member.

According to another aspect of the present disclosure; a battery pack includes; a pack case; and a plurality of cell stacks accommodated in an accommodation space of the pack case, wherein the pack case includes a lower plate on which the plurality of cell stacks are seated; and a partition member partitioning the accommodation space into a plurality of spaces, wherein a portion of the partition member facing the cell stack may be formed of a material melted at a temperature of 700° C. or higher.

In yet another aspect, the disclosed technology can be implemented to provide a battery pack that includes a pack case including sidewalls and a lower plate engaged to form an internal space, and an upper plate engaged to the sidewalls and lower plate to enclose the internal space; partition members engaged to sidewalls of the pack case and located in the internal space of the pack case to partition the internal space into an array of separate accommodation spaces; and a plurality of battery modules that are disclosed inside the separate accommodation spaces, respectively. Each partition member includes a support frame coupled to the lower plate and a blocking frame coupled to the support frame and disposed to face at least a respective battery module and each battery module includes one or more battery cells.

The above and other aspects and implementations of the disclosed technology are described in greater detail in the drawings, the description and the claims.

BRIEF DESCRIPTION OF DRAWINGS

The above and other aspects, features, and advantages of the present disclosure will be more clearly understood front the following detailed description, taken in conjunction with the accompanying drawings, in which.

DETAILED DESCRIPTION

Figure 1:
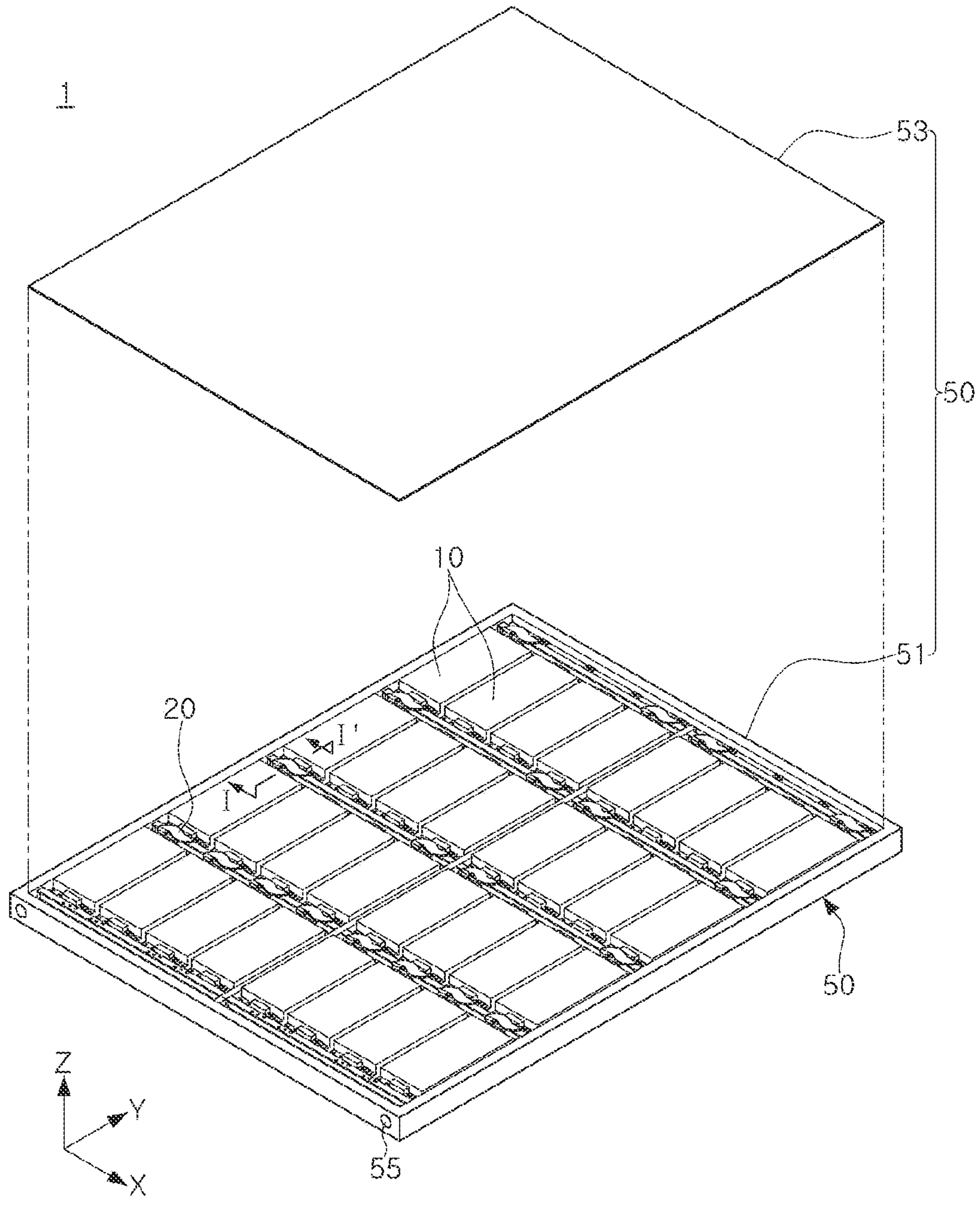
FIG. 1 is a perspective view schematically illustrating a battery pack based on some embodiments of the disclosed technology.
Figure 2:
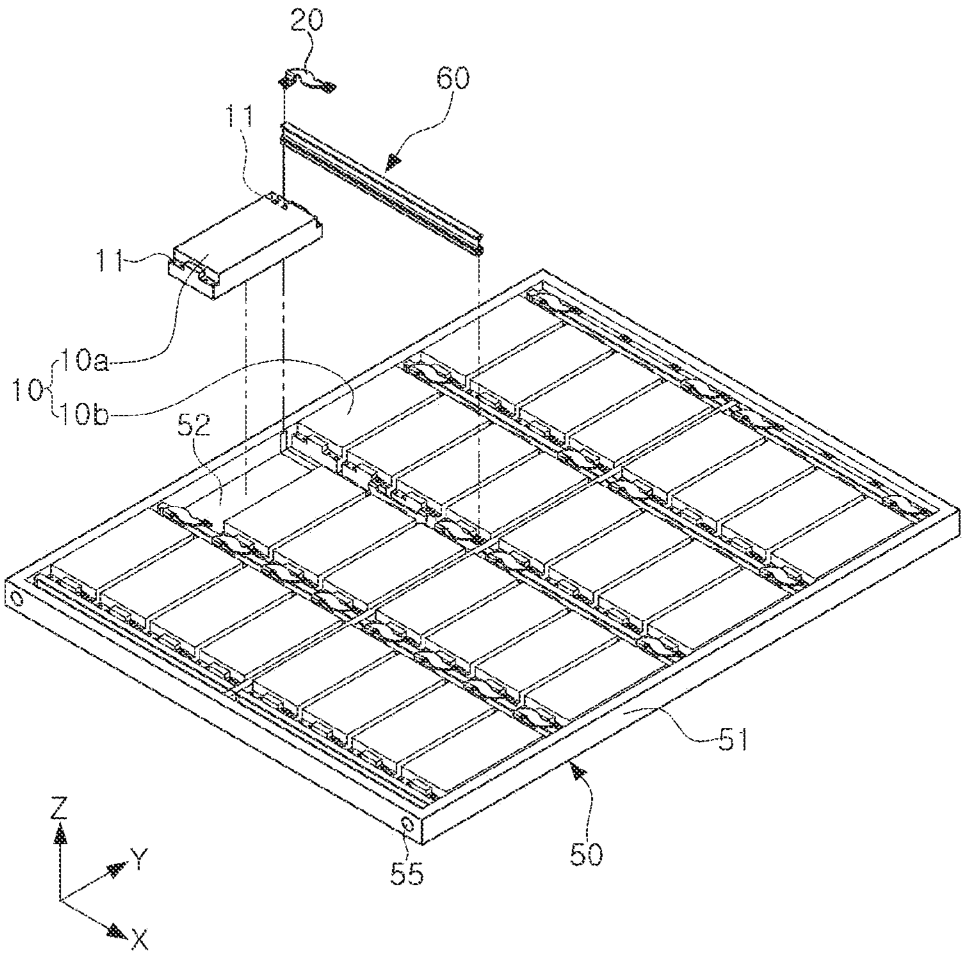
FIG. 2. is a partially exploded perspective view of FIG. 1.

FIG. 1 is a perspective view schematically illustrating a battery pack based on some embodiments of the disclosed technology. FIG. 2 is a partially exploded perspective view of FIG. 1. For convenience of description, in FIG. 2. an upper plate is omitted.

Referring to FIGS. 1 and 2, a battery pack 1 according to an exemplary embodiment in the present disclosure may include a plurality of cell stacks 10 and a pack case 50.

The cell stack 10 may include a secondary battery such as a lithium battery or a nickel-hydrogen battery capable of charging and discharging. Each cell stack 10 may include a plurality of battery cells stacked therein to have a hexahedral shape and may be accommodated in a case or a stacked state thereof may be fixed by a bracket or the like.

At least one terminal 11 may be provided on one side of the cell stack 10. The terminal 11 may be a conductive member disposed to be exposed to the outside of the cell stack 10 to electrically connect the battery cells to the outside.

In the present exemplary embodiment, the terminal 11 may be disposed on at least one of both ends of the cell stack 10 in a length direction. Also, an upper surface of the terminal 11 may be exposed to the outside of the cell stack 10.

The terminal 11 may include a positive terminal and a negative terminal. Both the positive terminal and the negative terminal may be disposed at one end of the cell stack 10 or may be distributed to be disposed at both ends of the cell stack 10.

A busbar 20 may be fastened to the terminal 11.

The busbar 20 may connect the terminals 11 of any one cell stack 10*a* (hereinafter, referred to as a first cell stack) and another adjacent cell stack 10*b* (hereinafter, referred to as the second cell stack) to each other. For example, the busbar 20 may contact the terminal 11 of the first cell stack 10*a* and the terminal 11 of the neighboring second cell stack 10*b* to connect the terminals 11 to each other electrically and physically The busbar 20 may include a busbar or a cable. Both ends of the busbar 20 may be respectively fastened to the terminals 11 of different cell stacks 10 through a fastening member such as a bolt.

The cell stacks 10 of the present exemplary embodiment may be connected to each other in series or in parallel through the busbar 20. In addition, if necessary, some of the cell stacks 10 may be connected in series, and some thereof may also be connected in parallel.

The busbar 20 according to the present exemplary embodiment may be formed by machining a flat rod-shaped conductive member. In addition, the busbar 20 may be formed of a material having flexibility. However, a configuration of the present disclosure is not limited thereto.

The pack case 50 may provide an accommodation space for accommodating other components therein. Accordingly, the pack case 50 may be provided in a form surrounding the entirety of the cell stacks 10, and the plurality of cell stacks 10 form a plurality of rows in the accommodation space of the pack case 50 and may be arranged side by side.

The pack case 50 may be formed of a metal material to ensure rigidity, but is not limited thereto. For example, in order to increase a heat dissipation effect, at least a portion of the pack case 50 may be formed of aluminum.

The pack case 50 may include a sidewall portion 51 forming an internal space, a lower plate 52 covering a lower portion of the internal space, and a partition member 60 disposed in the internal space. In addition, the pack case 50 may further include an upper plate 53 covering an upper portion of the internal space.

The sidewall portion 51 may form an outer surface of the pack case 50 and define an internal space. Accordingly, the cell stacks 10 may be accommodated in an internal space defined by the sidewall portion 51 and seated on the lower plate 52.

The partition member 60 may be disposed to cross the internal space formed by the sidewall portion 51 to divide the internal space into a plurality of accommodation spaces. Accordingly, at least a portion of the partition member 60 may be fastened to the sidewall portion 51.

The partition member 60 may reinforce overall rigidity of the pack case 50. The partition member 60 may be disposed between the cell stacks 10 to suppress propagation of gas or flames between the cell stacks 10.

Specifically, the partition member 60 may be disposed to cross between two cell stacks 10 disposed to face each other.

Accordingly, the cell stacks 10 may be distributed to be disposed in a plurality of accommodation spaces partitioned by the sidewall portion 51 and the partition member 60. In this case, the cell stacks 100 may be disposed so that one surface on which the terminal 11 is disposed faces the partition member 60, to be coupled to the pack case 50.

In addition, at least a portion of the partition member of the present exemplary embodiment may be formed of a material different from that of the lower plate 52. This is described in detail as follows.

Figure 3:
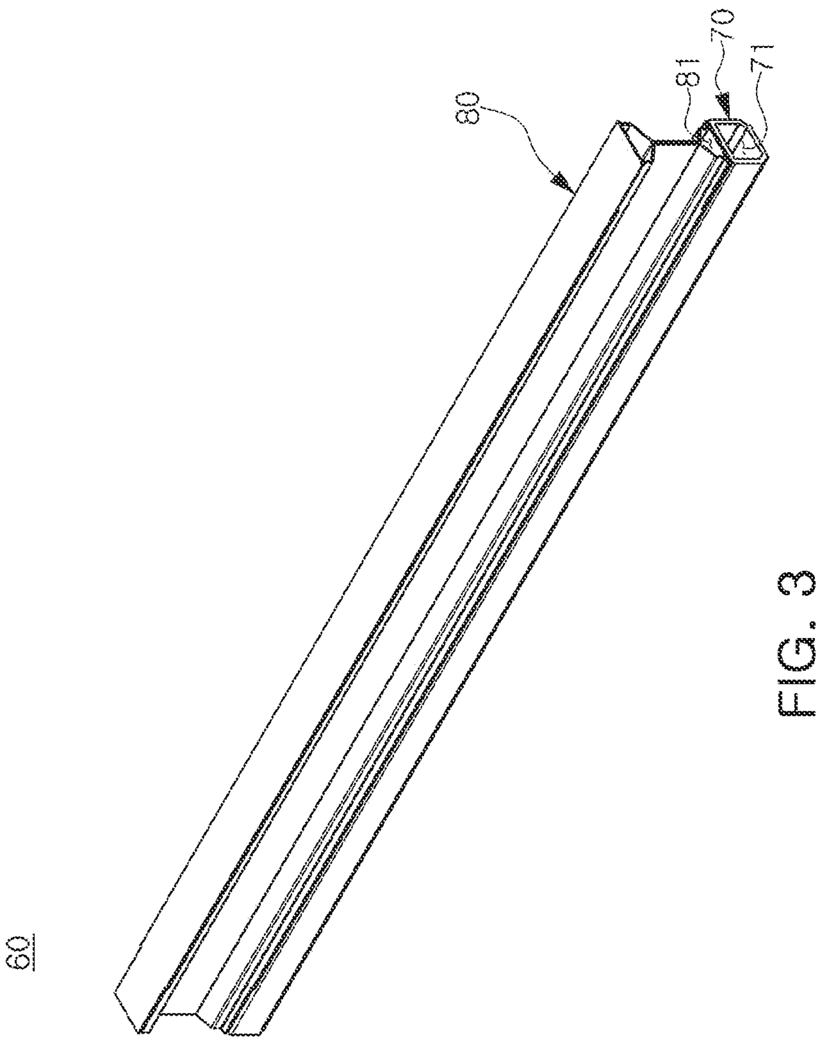
FIG. 3 is an enlarged perspective view of a partition member illustrated in FIG. 2.
Figure 4:
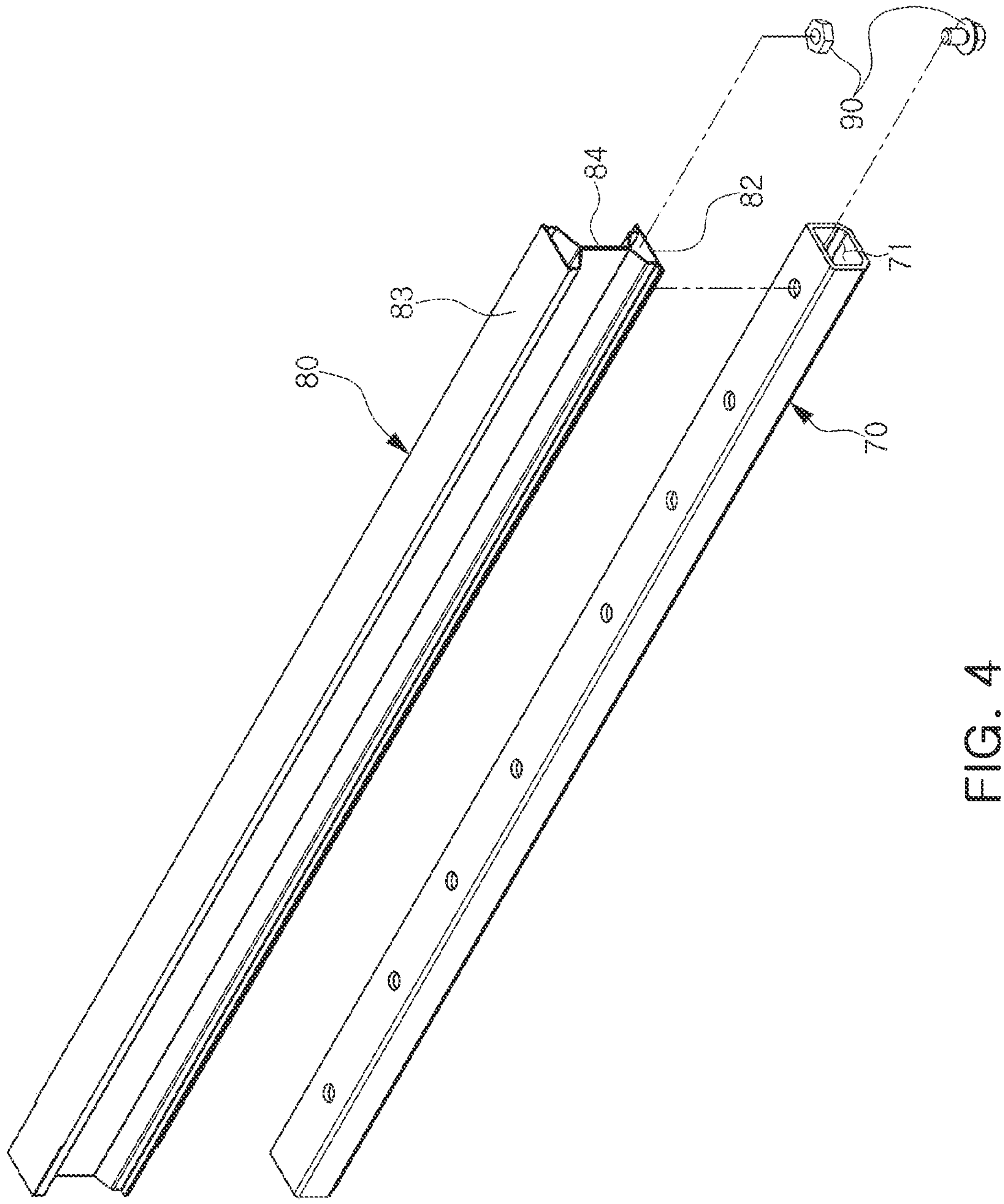
FIG. 4 is an exploded perspective view of the partition member illustrated in FIG. 3.
Figure 5:
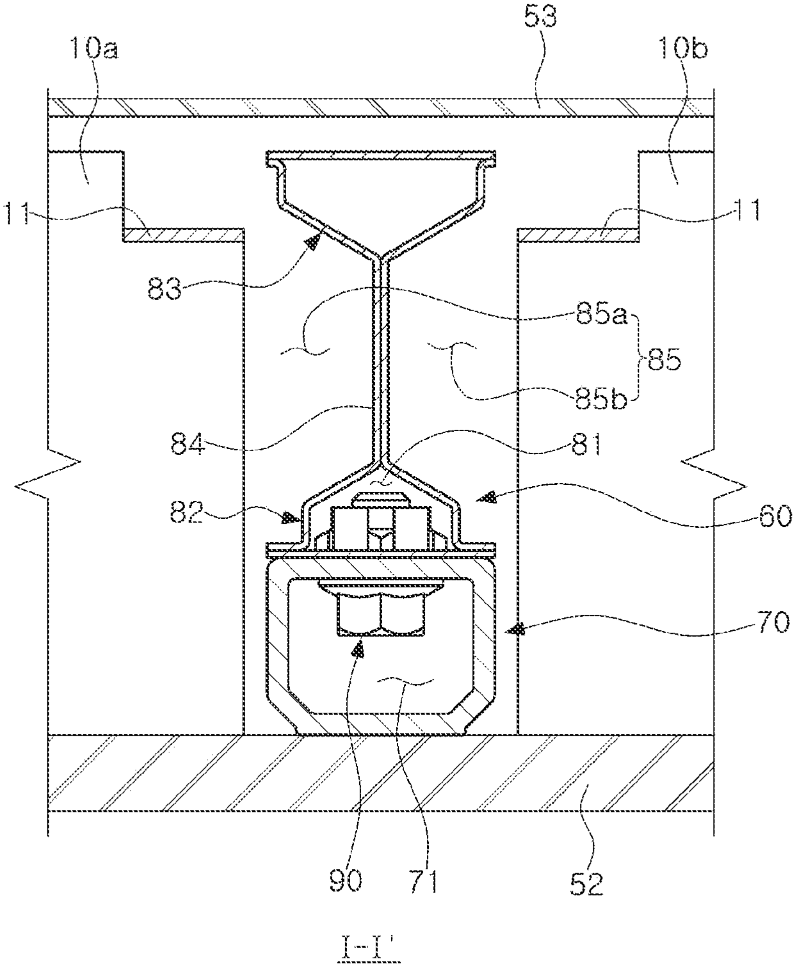
FIG. 5 is a cross-sectional view taken along line I-I' of FIG. 1.

FIG. 3 is an enlarged perspective view of the partition member illustrated in FIG. 2, FIG. 4 is an exploded perspective view of the partition member illustrated in FIG. 3, and FIG. 5 is a cross-sectional view taken along line I-I' of FIG. 1.

Referring to FIGS. 3 to 5, the partition member 60 may include a support frame 70 coupled to the lower plate 52 of the pack case 50 and a blocking frame 80 coupled to the support frame 70.

The support frame 70 is a member interconnecting the lower plate 52 to the blocking frame 80, and one side of the support frame 70 may be fixedly coupled to the lower plate 52, and the other side thereof may be coupled to the blocking frame 80.

A cooling device (not illustrated) may be provided on an outer surface of the lower plate 52 of the present exemplary embodiment. Since the cell stack 10 is seated on the lower plate 52, heat generated by the cell stack 10 may be directly transferred to the lower plate 52 of the pack case 50, and heat transferred to the lower plate 52 may be discharged externally through the cooling device coupled to the outer surface of the lower plate 52. Here, the cooling device may be an air cooling device or a water cooling device for dissipating heat. Also, the lower plate 52 may be configured as part of a cooling device.

In this configuration, since it is difficult to form a hole in the lower plate 52 it may be difficult to couple the support frame 70 to the lower plate 52 using a fastening member such as a bolt. Therefore, in the present exemplary embodiment, the support frame 70 may be fastened to the lower plate 52 by welding or the like without using a fastening member. However, when the support frame 70 and the lower plate 52 are formed of different materials so dissimilar metal bonding needs to be performed, the difficulty of the process may increase and it may be difficult to secure reliable bonding force.

Therefore, in the present exemplary embodiment, the support frame 70 may be formed of the same material as a material of the lower plate 52. in the present exemplary embodiment, the lower plate 52 may be formed of a material including aluminum having high thermal conductivity to dissipate heat generated by the battery cells externally. Accordingly, the support frame 70 of the present exemplary embodiment may also be formed of a material including aluminum the same as the material of the lower plate 52.

In the present exemplary embodiment, a rectangular tubular member may be used as the support frame 70. However, the configuration of the present disclosure is not limited thereto and the support frame 70 may be variously modified as long as it may be firmly fixed to the lower plate 52 and the blocking frame 80. However, in consideration of an energy density of the battery pack 1, a width of the support frame 70 may be the same as or similar to a width of the blocking frame 80.

The blocking frame 80 may be disposed on the support frame 70, and at least one surface thereof may be disposed to face the cell stacks 10. For example, the blocking frame 80 may be disposed to face one surface of the cell stack 10 on which the terminal 11 is disposed.

In general, when a battery cell ignites or explodes inside the cell stack 10, explosive by-products such as high-temperature gas or flames and metal particles occurring in the cell stack 10 are ejected to the outside of the cell stack 10 from the periphery of the terminal 11 of the cell stack 10.

Accordingly, in the partition member 60 of the present exemplary embodiment, the blocking frame 80 is disposed in a portion facing the cell stack 10. Specifically, the blocking frame 80 may be disposed to face the terminals 11 of the cell stack 10, and the explosion by-products discharged from the cell stack 10 may first contact the blocking frame 80.

To this end, the blocking frame 80 of the present exemplary embodiment is formed of a material that is not easily melted when coming into contact with explosion by-products.

The blocking frame 80 of the present exemplary embodiment is formed of a material having a melting point higher than that of the support frame 70 or the lower plate 52. Specifically, the blocking frame 80 may be formed of a high fire resistance material that is melted at a temperature of 700° C. or higher, and to this end, the blocking frame 80 may include a metal such as steel or an inorganic binder such as aerogel or synthetic mica. However, the present disclosure is not limited thereto, and a material, which has a rigidity similar to that of a metal and does not melt at a temperature less than 700° C., may be variously used. In addition, the blocking frame 80 may be manufactured through post-processing such as coating, a heat-treatment, or the like, to reinforce heat resistance, fire resistance, strength and rigidity.

The blocking frame 80 of the present exemplary embodiment may include a lower frame 80 in surface-contact with an upper surface of the support frame 70 and coupled to the support frame 70, an upper frame 83 spaced apart from the lower frame 82 by a predetermined distance and disposed to be parallel to the lower frame 82, and an intermediate frame 84 having a plate shape connecting the upper frame 83 to the lower frame 82.

In the present exemplary embodiment, one side of the intermediate frame 84 may be connected to the center of the upper frame 83 and the other side thereof may be connected to the center of the lower frame 82. Accordingly, the blocking frame 80 of the present exemplary embodiment may be formed to have a 'I' shape in a vertical cross section, and due to this structure, the terminal 11 of the cell stack 10 may be disposed to face a center frame of the blocking frame 80.

The cell stack 10 is spaced apart from the blocking frame 80 by a predetermined distance. Accordingly, an empty space having a predetermined size is formed between the upper frame 83 and the lower frame 82, that is, between the cell stack 10 and the intermediate frame 84. In the present exemplary embodiment, the empty space may be used as a venting flow path. 85.

When explosion byproducts such as gas are discharged from the cell stack 10 due to ignition of the battery cells, etc., the venting flow path 85 may be used as a passage through which the explosion byproducts move to the outside from the battery pack 1. Therefore, the explosion byproducts may move to the sidewall portion 51 of the pack case 50 through the venting flow path 85 and are then discharged to the outside of the pack case 50 through a venting hole 55 provided in the sidewall portion 51.

In the present exemplary embodiment, the venting flow path 85 may include a first venting flow path 85*a* disposed to face the first cell stack 10*a* and a second venting flow path 85*b* disposed to face the second cell stack 10*b*. As illustrated in FIG. 5, in the present exemplary embodiment, the first venting flow path 85*a* and the second venting flow path 85*b* may be divided by an intermediate frame 84, and may be horizontally symmetrical with respect to the intermediate frame 84. That is, the venting flow path 85 of the present exemplary embodiment may include two venting flow paths 85*a* and 85*b* that are spatially separated by one partition member 60.

Through this configuration, the first venting flow path 85*a* may be used as a passage for discharging explosion by-products of the first cell stack 10*a*, and the second venting flow path 85*b* may be used as a passage for discharging by-products of the second cell stack 10*b*. Therefore, even if flames or thermal runaway occurs in the cell stack disposed on one side of the intermediate frame 84, an influence thereof on a cell stack on the other side may be minimized. However, the present disclosure is not limited to the above configuration and may be modified in various forms as in the exemplary embodiments to be described later.

In some implementations, the pack case 50 may be provided with a passage through which the explosion byproducts may move to the venting hole 55. The passage may be formed through an internal space of the sidewall portion 51 or may be formed as a space between the sidewall portion 51 and the cell stack 10. Therefore, the explosion byproducts introduced into the venting flow path 85 may be discharged to the outside through the venting hole 55 after being introduced into the passage described above. Accordingly, rapid propagation of flames/heat and secondary damage may be minimized.

The blocking frame 80 may be fastened to the support frame 70 through a fastening member 90 such as a bolt or a nut. For example, the fastening member 90 may partially pass through the support frame 70 and the blocking frame 80 and be fastened to integrally fix the blocking frame 80 and the support frame 70. A plurality of fastening members 90 may be provided to be fastened to the partition member 60 in a length direction of the partition member 60.

Accordingly, even if the blocking frame 80 and the support frame 70 are formed of different materials, the blocking frame 80 and the support frame 70 may be easily coupled to each other. However, the configuration of the present disclosure is not limited thereto, and the blocking frame 80 and the support frame 70 may be mutually bonded using an adhesive, or the blocking frame 80 may be coupled to the support frame 70 by a sliding coupling method. That is, various coupling methods may be used as long as the blocking frame 80 may be firmly coupled to the support frame 70.

When the blocking frame 80 and the support frame 70 are fastened with the fastening member 90, a fastening space 81 in which the fastening member 90 is partially disposed may be provided at the lower frame 82 of the blocking frame 80. To this end, the lower frame 82 of the blocking frame 80 of the present exemplary embodiment may be formed in a pipe shape. Similarly, a fastening space 71 may be provided in the support frame 70. However, the configuration of the present disclosure is not limited thereto.

In the battery pack 1 of the present exemplary embodiment configured as described above, the partition member 60 is formed of a material having a melting point higher than that of the upper plate 53 or the lower plate 52 of the pack case 50. Therefore, the partition member 60 may not be easily melted even when coming contact with the explosive by-products, thus minimizing the breakage of the partition member 60 by the explosive by-products, thereby suppressing the occurrence of secondary ignition or explosions due to the diffusion of flames or high-temperature gas.

In some implementations, a configuration in which the entire pack case 50 is formed of the same material as that of the blocking frame 80 may be considered, but in this case, a weight of the battery pack 1 may be increased and a heat dissipation effect may be reduced.

In some implementations, in the battery pack 1 of the present exemplary embodiment, since the lower plate 52 may be formed of an aluminum material, the weight may be minimized in addition to the aforementioned effect, and at the same time, high heat dissipation performance may be provided.

In some implementations, the present disclosure is not limited to the exemplary embodiment described above and various modifications may be made.

Figure 6:
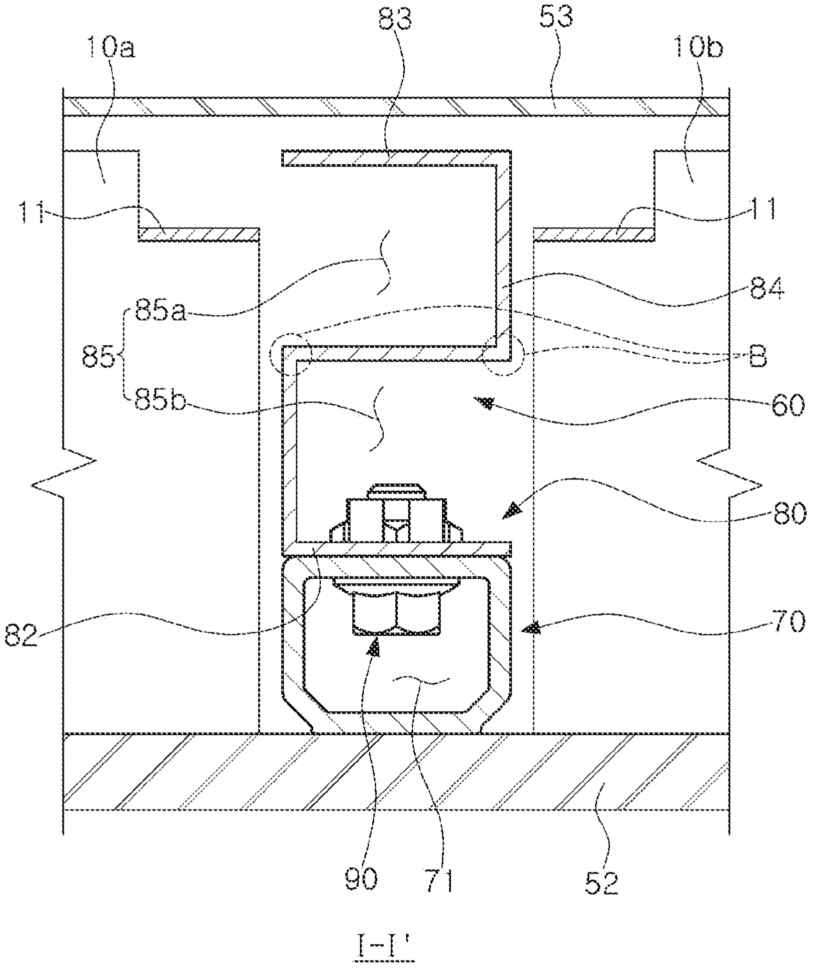
FIG. 6 is a cross-sectional view of a battery pack based on some embodiments of the disclosed technology.
Figure 7:
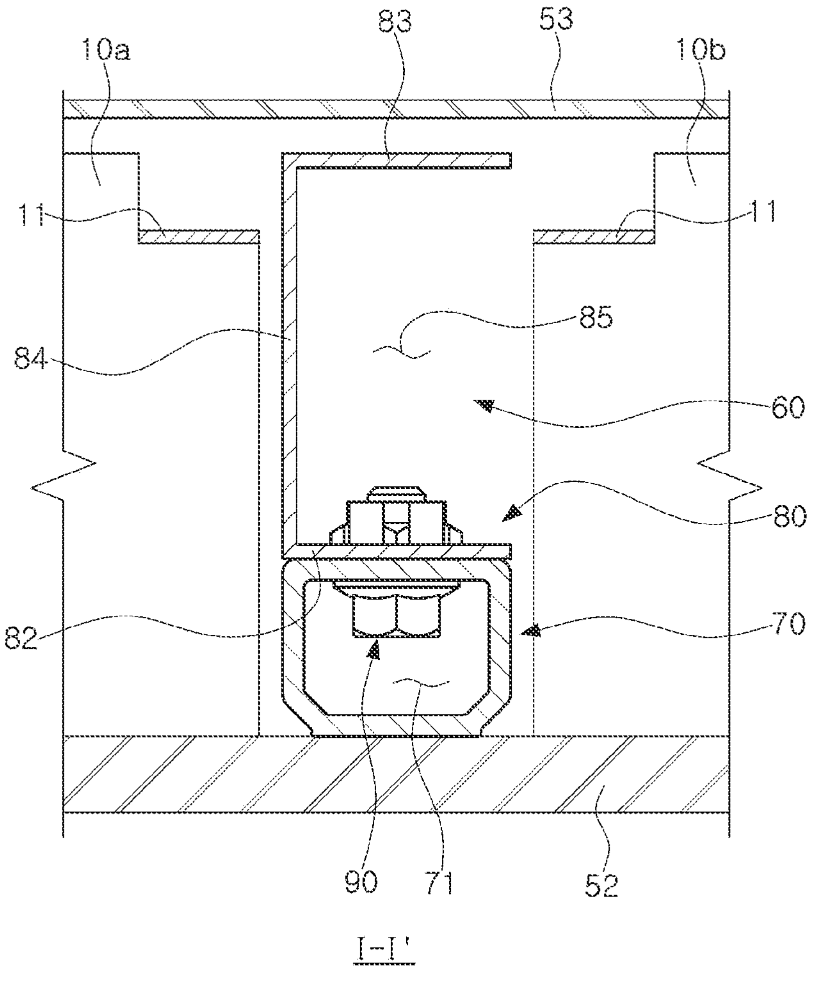
FIG. 7 is a cross-sectional view of a battery pack based on some embodiments of the disclosed technology.
Figure 8:
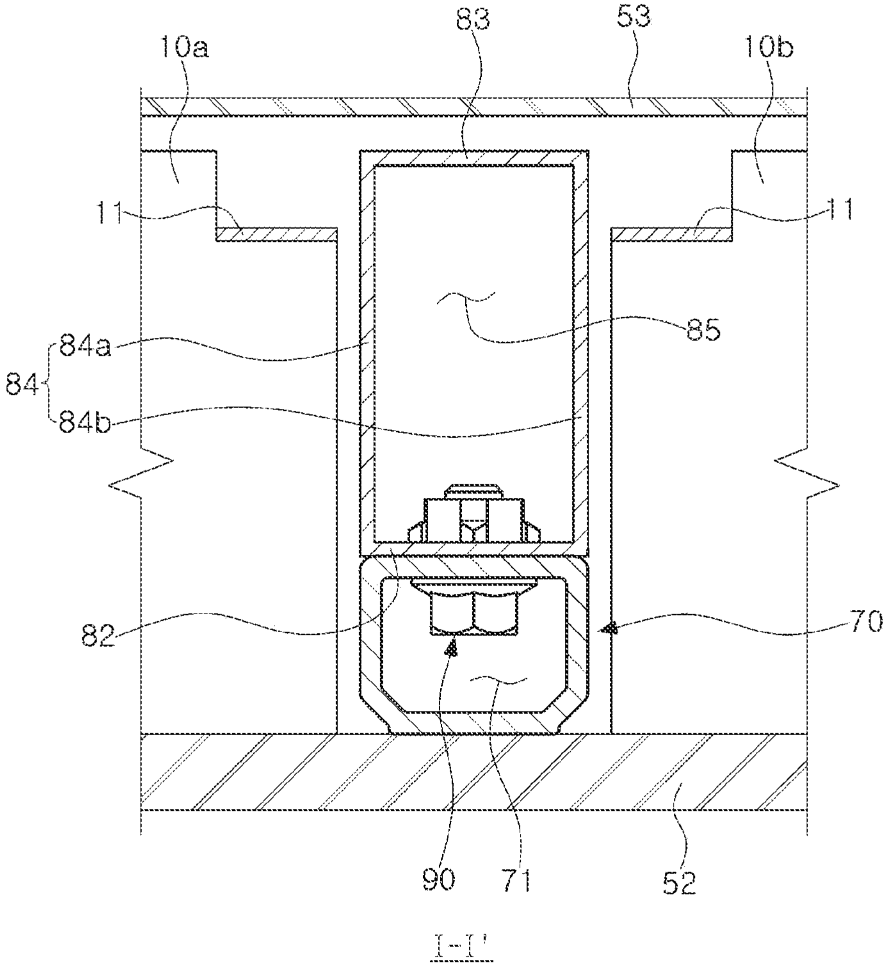
FIG. 8 is a cross-sectional view of a battery pack based on some embodiments of the disclosed technology.

FIGS. 6 to 8 are cross-sectional views of a battery pack based on some embodiments of the disclosed technology, respectively, illustrating a cross-section corresponding to FIG. 5 and illustrating an example in which a shape of the blocking frame 80 is modified.

Referring to FIG. 6 first, the blocking frame 80 of the present exemplary embodiment may have a zigzag cross-section. Specifically, one side of the intermediate frame 84 may be connected to one side of the upper frame 83, and the other side thereof may be connected to the other side of the lower frame 82. In addition, the intermediate frame 84 may include at least one bent portion B.

In the present exemplary embodiment, the intermediate frame 84 may have two bent portions B, and the intermediate frame 84 may be bent by 90° at each of the bent portions B. Accordingly, the blocking frame 80 of the present exemplary embodiment may be formed in a 'ㄹ' shape in its entire cross-section.

In this case, the two venting flow paths 85*a* and 85*b* may be stacked in a vertical direction. Specifically, the first venting flow path 85*a* disposed to face the first cell stack 10*a* may be disposed above or below the second venting flow path 85*b* disposed to face the second cell stack 10*b*.

In the present exemplary embodiment, a case in which the bent portion B is formed in the intermediate frame 84 is taken as an example, but the configuration of the present disclosure is not limited thereto, and the bent portion B may be omitted and the intermediate frame 84 may be formed in the form of a flat. In this case, the blocking frame 80 may be formed in a 'Z' shape in the entire cross section thereof.

Referring to FIG. 7, in the blocking frame 80 of the present exemplary embodiment, both sides of the intermediate frame 84 may be connected to one side of the upper frame 83 and one side of the lower frame 82, respectively. Accordingly, the blocking frame 80 of the present exemplary embodiment may be formed in a 'C' shape in the entire cross section thereof.

Also, referring to FIG. 8, in the blocking frame 80 of the present exemplary embodiment, two intermediate frames 84*a* and 84*b* may be spaced apart from each other. The intermediate frame 84 of the present exemplary embodiment may include a first intermediate frame 84*a* connecting one side of the upper frame 83 to one side of the lower frame 82 and a second intermediate frame 84*b* connecting the other side of the upper frame 83 to the other side of the lower frame 82. Accordingly, the blocking frame 80 of the present exemplary embodiment may be formed in a 'ㅁ' shape in the entire cross section thereof.

In this case, an internal space of the blocking frame 80 may be used as the venting flow path 85. Also, although not illustrated, the first intermediate frame 84*a* or the second intermediate frame 84*b* may be provided with an opening through which explosion by-products may be introduced into the venting flow path 85.

Figure 9:
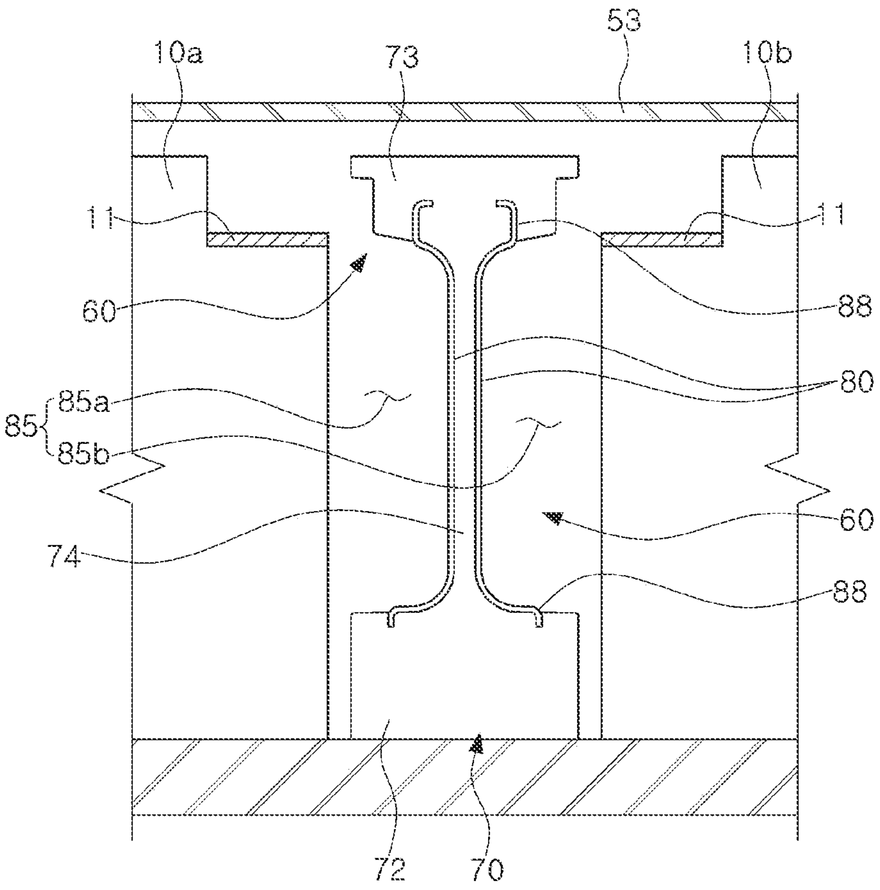
FIG. 9 is a cross-sectional view of a battery pack based on some embodiments of the disclosed technology.

FIG. 9 is a cross-sectional view of a battery pack based on some embodiments of the disclosed technology, illustrating a cross-section corresponding to FIG. 5. Also, FIG. 10 is an exploded perspective view of a partition member illustrated in FIG. 9.

Figure 10:
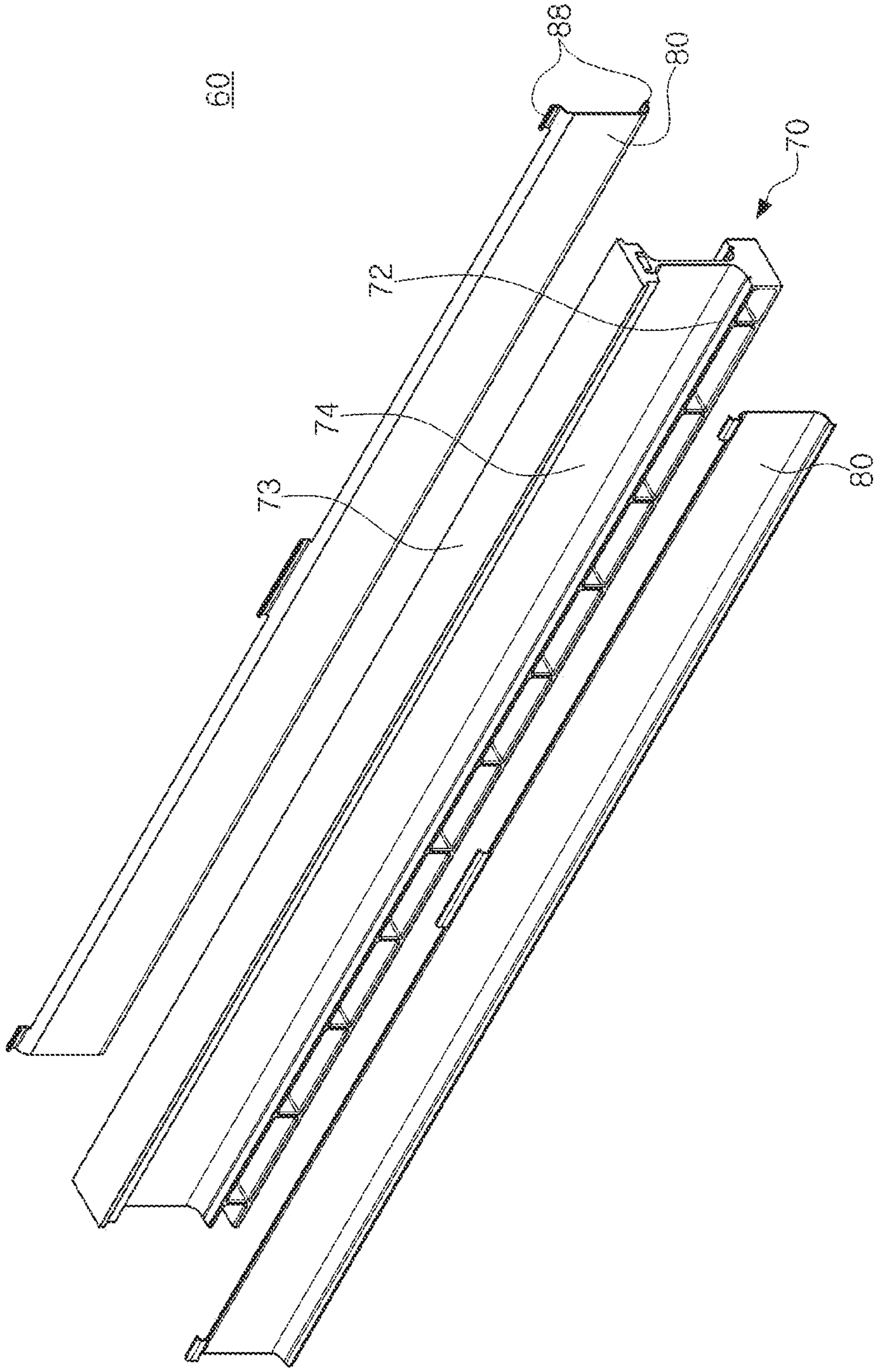
FIG. 10 is an exploded perspective view of a partition member illustrated in FIG. 9.

Referring to FIGS. 9 and 10, in the partition member 60 of the present exemplary embodiment, the support frame 70 constitutes an overall skeleton of the partition member 60, and the blocking frame 80 may be coupled to a side surface of the support frame 70.

One side of the support frame 70 of the present exemplary embodiment may be fixedly fastened to the lower plate 52, and the other side thereof may be disposed to face the upper plate 53. As in the exemplary embodiment described above, the support frame 70 may be fastened to the lower plate 52 by welding or the like. Accordingly, the support frame 70 may be formed of the same material as that of the lower plate 52.

More specifically, the support frame 70 of the present exemplary embodiment may include a bonding portion 72 bonded to the lower plate 52 and a coupling portion 74 to which the blocking frame 80 is coupled.

One surface of the bonding portion 72 may be bonded to the lower plate 52, and thus the bonding portion 72 may be configured similarly to the support frame 70 of FIG. 5 described above. However, the present disclosure is not limited thereto, and the bonding portion 72 may be modified to have various shapes as long as it is firmly fixed to the lower plate 52.

The coupling portion 74 may be formed to extend from an upper surface of the bonding portion 72 toward the upper plate 53. In the present exemplary embodiment, the coupling portion 74 may be formed in the form of a plate in which both surfaces are flat. However, the present disclosure is not limited thereto, and the coupling portion 74 may be configured to have a curvature if necessary. Here, both surfaces of the coupling portion 74 refer to surfaces disposed to face the cell stack 10.

In addition, the support frame 70 may include an expansion portion 73 disposed above the coupling portion 74. Therefore, the coupling portion 74 may be disposed to connect the expansion portion 73 to the bonding portion 72.

The expansion portion 73 may be disposed to be spaced apart from the bonding portion 72 by a predetermined distance, and may be formed to expand a thickness of the coupling portion 74. In addition, a width of the expansion portion 73 may be formed to have a width similar to or equal to that of the bonding portion 72.

In the present exemplary embodiment, the coupling portion 74 connects the center of the expansion portion 73 to the center of the bonding portion 72. Accordingly, the support frame 70 of the present exemplary embodiment may be formed in a shape similar to that of the blocking frame 80 illustrated in FIG. 5. For example, the expansion portion 73 may be configured to be similar to the upper frame 83 of the blocking frame 80 illustrated in FIG. 5, the coupling portion 74 may be configured to be similar to the intermediate frame 84, and the bonding portion 72 may be configured to be similar to the lower frame 82 and the support frame 70 illustrated in FIG. 5.

Therefore, an empty space may be formed between the expansion portion 73 and the bonding portion 72, and this empty space may be used as the venting flow path 85.

However, the configuration of the present disclosure is not limited thereto, and as in the exemplary embodiments of the blocking frame described above, the coupling portion 74 may be connected to the expansion portion 73 and the bonding portion 72 in various forms.

The blocking frame 80 of the present exemplary embodiment may be provided in the form of a plate and may be stacked on the coupling portion 74. Therefore, the blocking frame 80 may be formed in the form of a plate corresponding to both surfaces of the coupling portion 74.

The cell stack 10 of the present exemplary embodiment may be disposed such that the terminal 11 faces the blocking frame 80. To this end, the blocking frame 80 may be disposed on both entire surfaces of the coupling portion 74. However, the configuration of the present disclosure is not limited thereto, and if necessary, the blocking frame 80 may be configured so that the coupling portion 74 is partially exposed.

The blocking frame 80 and the support frame 70 may be formed of the same material as that of the exemplary embodiment described above. For example, the blocking frame 80 may be formed of a material having a melting point higher than that of the support frame 70 or the lower plate 52.

The partition member 60 of the present exemplary embodiment configured as described above may be manufactured by an insert injection method. For example, the blocking frame 80 may be first prepared and placed in a mold, and then the support frame 70 may be formed by a die-casting method to integrally manufacture the blocking frame 80 and the support frame 70.

In this case, at least a portion of the blocking frame 80 may be embedded in the support frame 70. Specifically, the blocking frame 80 may include an embedded portion 88 embedded in the support frame 70. In the present exemplary embodiment, the embedding portion 88 may be embedded in each of the bonding portion 72 and the expansion portion 73 of the support frame 70, but the present disclosure is not limited thereto and the embedded portion 88 may be configured to be embedded in the coupling portion 74 as necessary.

In some implementations, the partition member 60 of the present exemplary embodiment is not limited to the aforementioned configuration and may be manufactured in various manners. That is various modifications may be made, for example, the blocking frame 80 and the support frame 70 may be separately manufactured and then coupled to each other using an adhesive or a fastening member, or the blocking frame 80 may be coupled to the support frame 70 by a fitting method or a sliding coupling method.

As set forth above, according to an exemplary embodiment in the present disclosure, the partition member of the battery pack is formed of a material having a melting point higher than that of the upper plate or lower plate of the pack case. Therefore, the partition member may not be easily melted even when coming into contact with explosion by-products, thereby minimizing damage to the pack case by the explosion by-products, and thereby suppressing the occurrence of secondary ignition or explosions due to the diffusion of flames or high-temperature gas.

One of the various effects of the present disclosure is uniformly forming the Ni plating layer and a thin, uniform plating layer including Pd on the Ni plating layer by flattening a surface on which the Ni plating layer is to be formed and imparting conductivity by disposing the Sn plating layer on the electrode.

One of the various effects of the present disclosure is preventing corrosion or deposition of the external electrodes and improving reliability.

One of the various effects of the present disclosure is providing the multilayer electronic component suitable for mounting on a substrate using a conductive resin adhesive.

Only a few implementations and examples are described and other implementations, enhancements and variations can be made based on what is described and illustrated in this patent document.

What is claimed is:

1. A battery pack comprising:

a pack case; and a plurality of cell stacks accommodated in an accommodation space of the pack case, wherein the pack case includes a lower plate on which the plurality of cell stacks is disposed and a partition member partitioning the accommodation space, and at least a portion of the partition member is formed of a material different from a material of the lower plate, wherein the partition member includes a support frame coupled to the lower plate and a blocking frame coupled to the support frame and disposed to face at least one of the cell stacks, wherein the support frame includes:

a bonding portion bonded to the lower plate;

an expansion portion spaced apart from the bonding portion by a predetermined distance; and a coupling portion connecting the bonding portion to the expansion portion, wherein the blocking frame is provided in a plate form and is stacked on both surfaces of the coupling portion.

2. The battery pack of claim 1, wherein at least a portion of the blocking frame is embedded in the support frame.

* * * * *